United States Patent
Stola et al.

(10) Patent No.: US 7,840,218 B2
(45) Date of Patent: *Nov. 23, 2010

(54) METHOD AND SYSTEM FOR RADIO COVERAGE PLANNING WITH LOCAL DOUBLE GRID APPROACH

(75) Inventors: Loris Stola, Turin (IT); Daniela Maria Tealdi, Turin (IT); Francesco Epifani, Turin (IT)

(73) Assignee: Telecom Itala S.p.A., Milan (IT)

( * ) Notice: Subject to any disclaimer, the term of this patent is extended or adjusted under 35 U.S.C. 154(b) by 514 days.

This patent is subject to a terminal disclaimer.

(21) Appl. No.: 10/588,370

(22) PCT Filed: Feb. 5, 2004

(86) PCT No.: PCT/EP2004/050087

§ 371 (c)(1),
(2), (4) Date: May 16, 2007

(87) PCT Pub. No.: WO2005/076645

PCT Pub. Date: Aug. 18, 2005

(65) Prior Publication Data

US 2007/0281706 A1 Dec. 6, 2007

(51) Int. Cl.
*H04W 40/00* (2009.01)
(52) U.S. Cl. .............. 455/446; 455/67.11; 455/550.1; 455/447; 455/419; 455/424
(58) Field of Classification Search .............. 455/422.1, 455/423, 67.11, 414.1, 443, 446, 456.1, 403, 455/550.1, 447, 69.11, 419, 424
See application file for complete search history.

(56) References Cited

U.S. PATENT DOCUMENTS 5,561,841 A * 10/1996 Markus ................... 455/446

(Continued)

FOREIGN PATENT DOCUMENTS

EP 0 865 221 A1 9/1998

(Continued)

OTHER PUBLICATIONS

Cichon, et al., "Ray Optical Prediction of Outdoor and Indoor Coverage in Urban Macro- and Micro-Cells", Vehicular Technology Conference, IEEE 46$^{th}$ Atlanta, GA, pp. 41-45, (Apr. 28, 1996).

(Continued)

*Primary Examiner*—Kamran Afshar
*Assistant Examiner*—Babar Sarwar
(74) *Attorney, Agent, or Firm*—Finnegan, Henderson, Farabow, Garrett & Dunner, L.L.P.

(57) ABSTRACT

A method for planning a radiocommunications network includes computing cell coverage in turn including dividing a region around a radio base station into a number of large environment pixels, for each large environment pixel, computing a first quantity indicative of the coverage within the large environment pixel, dividing each large environment pixel into a number of small environment pixels, and, for each small environment pixel, computing a second quantity indicative of the coverage within the small environment pixel, wherein each second quantity is computed for the respective small environment pixel as a function of the first quantity computed for the large environment pixel containing the small environment pixel, and of data describing the environment within the small environment pixel and within small environment pixels within the large environment pixel and arranged upstream the small environment pixel along a radio-electric signal propagation path passing through the small environment pixel.

23 Claims, 4 Drawing Sheets

U.S. PATENT DOCUMENTS

| | | | |
|---|---|---|---|
| 5,953,669 A * | 9/1999 | Stratis et al. | 455/449 |
| 6,002,935 A * | 12/1999 | Wang | 455/447 |
| 6,047,238 A * | 4/2000 | Olofsson | 702/2 |
| 6,111,857 A * | 8/2000 | Soliman et al. | 370/254 |
| 6,173,168 B1 * | 1/2001 | Andersson | 455/404.1 |
| 6,173,185 B1 * | 1/2001 | Bernardin et al. | 455/446 |
| 6,587,690 B1 * | 7/2003 | Di Huo et al. | 455/446 |
| 6,636,739 B1 * | 10/2003 | Fagen et al. | 455/453 |
| 6,792,248 B1 * | 9/2004 | Naghian | 455/69 |
| 7,363,039 B2 * | 4/2008 | Laroia et al. | 455/448 |
| 7,469,144 B2 * | 12/2008 | Vicharelli et al. | 455/446 |
| 2001/0041565 A1 | 11/2001 | Vicharelli et al. | |
| 2005/0090217 A1 * | 4/2005 | Zhu | 455/242.1 |
| 2007/0037579 A1 * | 2/2007 | Francalanci et al. | 455/446 |
| 2007/0270153 A1 * | 11/2007 | Lanzo et al. | 455/446 |

FOREIGN PATENT DOCUMENTS

| | | |
|---|---|---|
| EP | 1 292 163 A1 | 3/2003 |

OTHER PUBLICATIONS

Dersch, et al., "Modelling and Simulation of Indoor Radio Channels", Proceedings of the International Conference on Communications (ICC), IEEE, vol. 3, pp. 1970-1974, (May 23, 1993).

G. Bussolino, R. Lanzo, M. Perucca, "Rasputin: a field strength prediction model for large and small cell mobile system using a territorial data-base", 7$^{th}$ International Network Planning Symposium, Sidney, 191-196, (1996).

ITU-Recommendations, Radiocommunication Assembly, Geneva, Document 3/1007-E, "Propagation by Diffraction", Draft Revision of Recommendation ITU-R PN. 526-3, pp. 1-18, (1995).

M. Hata, "Empirical formula for propagation loss in land mobile services", IEEE Trans. on Vehicular Technology, vol. 29, No. 3, pp. 317-325, (1980).

E. Damosso, L. Stola, Radiopropagazione, "Propagazione Nei Sistemi Radiomobili Terrestri", Scuola Superiore Guglielmo Reiss Romoli, L'Aquila, pp. 129-187, (1992).

ITU—R Rec. 1411, "Propagation data and prediction methods for the planning of short range outdoor radio communication systems and radio local area networks in a frequency range 300 MHz to 100 GHz", pp. 1-11, (1999).

COST 235 "Radiowave propagation effects on next generation fixed service terrestrial telecommunication systems", Chap. 4, Final Report EUR 16992 EN, pp. 242-251 and 404-407, (1996).

M. Perucca, "Small cells planning: analysis of electromagnetic models from measurements at 1800 MHz", Tenth International Conference on Antennas and Propagation (CAP), pp. 1-12, (1997).

COST Action 231, "Digital mobile radio towards future generation systems", Chap. 4, Final Report EUR 18957, pp. 135-140, (1999).

Office Action mailed from the U.S. Patent and Trademark Office on May 26, 2009, in U.S. Appl. No. 10/588,371, filed May 15, 2007, 17 pages.

Office Action mailed from the U.S. Patent and Trademark Office on Dec. 24, 2009, in U.S. Appl. No. 10/588,371, filed May 15, 2007, 15 pages.

* cited by examiner

METHOD AND SYSTEM FOR RADIO COVERAGE PLANNING WITH LOCAL DOUBLE GRID APPROACH

CROSS REFERENCE TO RELATED APPLICATION

This application is a national phase application based on PCT/EP2004/050087, filed Feb. 5, 2004, the content of which is incorporated herein by reference.

TECHNICAL FIELD OF THE INVENTION

The present invention relates in general to radiocommunications network planning. In particular, the present invention finds an advantageous, but not exclusive, application in the planning of a radiocommunications network for mobile terminals, comprising a number of (large or small) cells distributed over a particular geographical area or territory, to which the ensuing treatment will explicitly refer, without this entailing any loss of generality.

BACKGROUND ART

As is known, the first essential step of a process for designing and planning a radiocommunications network for mobile terminals is computing the so-called cell coverage, i.e., extent and features of a region around a radio base station where radioelectric signals received by a mobile terminal and radiating out from the radio base station cope with given requirements.

Generally, this region is the locus of points where the strength, or a quantity related thereto, of a radioelectric signal received by the mobile terminal and radiating out from the radio base station exceeds a given threshold. Such a threshold may be defined by using different criteria, the most adopted of which are detectability of a reference channel in the radioelectric signal received by the mobile terminal, and transmission error rate higher than a threshold value.

Traditionally, one of the most frequently used methods for computing cell coverage includes radially scanning the region around the radio base station along angularly equispaced radial scanning line connecting the radio base station and the point where one of the following three quantities, which, considered singularly, may be regarded as indicative of the cell coverage, is to be computed: the point strength of the radioelectric signal received by the mobile terminal, the local mean of the point strength of the radioelectric signal, and the median value of the local means of the point strength of the radioelectric signal.

The point strength is the value of the modulus (or envelope) of the radioelectric signal in a given point of the region, the dimensions of point being substantially equal to those of the physical element which is used to measure the point strength of the radioelectric signal: in this case, the mobile terminal antenna of few centimeters.

The local mean is the mean value of the point strength of the radioelectric signal within some tens of wavelengths long, which, having regard to the frequencies involved in mobile radiocommunications, results in considering paths 5 to 10 meters long or areas some tens of square meters wide.

The median value of the local means of the point strength of the radioelectric signal is a resumptive statistical value which, to guarantee a satisfying reliability (confidence) thereof, is to be computed by taking account of a congruous number of local means (10 to 20), which results in considering paths 50 to 100 meters long or areas few thousands of square meters wide.

Measuring the point strength of the radioelectric signal is not presently one of the key points in the development of radiocommunications network planning tools because of the extreme spatial variability of the radioelectric signal strength due to the "fine" structure (order of magnitude of the centimeter) of the surrounding environment.

Computing the local mean of the point strength of the radioelectric signal is, nowadays, still marginal in mobile radiocommunications network planning due to the modellization and computation complexity and to the huge amount of environmental data (cartographic database) to be processed.

This quantity is generally taken into account only during coverage computation for micro cells (cells with radio base stations arranged at few meters from the ground), which are characterized by narrow territorial extents (diameter of some hundreds of meters) and which are the minority (about 10%) of the cells forming a typical mobile radiocommunications network.

Computation of this quantity is indeed hard to carry out for traditional cells, i.e. cells having a coverage area with a diameter of several kilometers, such as large cells (cells with radio base stations arranged on isolated masts) or small cells (cells with radio base stations arranged on building roofs), due to the high computation time and, above all, to the low reliability of the results at these distances.

On the contrary, computing the median value of the local means of the point strength of the radioelectric signal plays a paramount role in the development of radiocommunications network planning tools because in most cases this quantity represents the physical parameter associated with the concept of cell coverage. Therefore, nowadays the design of a mobile radiocommunications network is substantially based on a electromagnetic coverage prediction based on the median values of the local means.

A traditional cell coverage computation, sometimes also referred to as cell coverage prediction, is carried out by using a low environment resolution, i.e., by taking account of data describing the features of the environment within elementary areas, generally known as pixels, having a side of 50 or 100 meters.

The median values of the local means of the point strength of the radioelectric signal along the scanning lines are computed by taking account of the power radiating out from the radio base station, a open environment propagation curve, a morphological factor, a urbanization factor and an orographical factor (diffraction on natural obstacles).

In particular, the open environment propagation curve is indicative of the radioelectric signal strength attenuation, also known as propagation loss, in a open area, i.e., an area empty of trees, buildings or architectural structures made by human beings, and is generally expressed as a semi-empiric relation as a function of the power radiating from the radio base station antenna, antenna radiation pattern, distance from the radio base station and the mobile terminal, antenna tilt, radiation frequency, and effective antenna height with respect to the ground.

The orographical factor, urbanization factor and the morphological factor are correction factors for the open environment propagation curve and describe, respectively, the altitude features of the geographical area, the building features within areas having selectable sizes (e.g. 50 by 50 meters), and the geographical area in terms of morphological classes (forested, lakeside, etc.), which, as is known, influence radioelectric signal propagation.

In some cases, only morphological and urbanization features within the pixel, for which computation of the local means of the radioelectric signal strength is carried out, are taken into account, whereas in other cases, characterized by a more refined approach, these features all along the scanning lines are taken into account.

Lastly, computing diffraction on natural obstacles is the aspect that requires a more complex processing of the cartographic data. Starting from the orography, an altimetric profile is determined all along each scanning line, and the interaction effects (signal attenuation) with the possible natural obstacles arranged along the scanning lines are computed by resorting to the classic Huyghens-Fresnel theory, according to which such interaction effects may be assessed with adequate reliability by replacing each natural obstacle with an equivalent virtual obstacle (screen) having a knife edge shape, a height equal to the natural obstacle, an infinitesimal thickness, endlessly extending perpendicularly to the propagation direction, and perfectly absorbing the incident electromagnetic signal.

Other more advanced approaches are provided, instead, for computing diffraction on natural obstacles by resorting, rather than to an infinitesimal thick screen, to a finite thick screen having a rounded edge. However, the approaches based on an infinitesimal thick screen are the most frequently used because they are simple and are adapted to this specific problem on the basis of some known algorithms which have been derived from the literature and appropriately modified and optimized to take into account the effects due to multiple obstacles. Examples of such known algorithms are the Epstein-Peterson method, the Deygout method and the stretched string method, the latter being recommended by ITU-R 526 and being the best trade-off between result reliability and algorithm computational speed and thus the most frequently used.

For a more detailed discussion of the low environment resolution cell coverage computation, the reader is referred to the following publications, which are incorporated herein by reference, in their entirety:

1) M. Hata, "*Empirical formula for propagation loss in land mobile services*", IEEE Trans. On Vehicular Technology, Vol. 29, 1980;
2) E. Damosso, L. Stola, "*Radiopropagazione*", Scuola Superiore Guglielmo Reiss Romoli, L'Aquila, 1992;
3) ITU-Reccommendations Rec. P. 526-3 "*Propagation by diffraction*";
4) G. Bussolino, R. Lanzo, M. Perucca, "*Rasputin: a field strength prediction model for large and small cell mobile system using territorial data base*", 7$^{th}$ International Network Planning Symposium, Sidney 1996;
5) COST 235 "*Radiowave propagation effects on next generation fixed service terrestrial telecommunication systems*", Chap. 4, Final Report EUR 16992 EN, 1996.

The need for a growing number of radio base stations, together with the need for more complete services, in particular services having features more and more detailed on a territorial level, has forced second and third generation mobile radiocommunications network providers to resort to a high environment resolution network design which enables definition of specific design parameters for very narrow territory elements. For example, along a road or in a square given services may be provided rather than others and, in any case, services with a level appropriate to the specific territorial, social and town reality.

The low environment resolution, which is typical of traditional mobile radiocommunications network design and planning, is evidently inadequate to cope with the above-mentioned needs, which may instead be partially satisfied by using a high environment resolution, i.e., by taking account of data describing the features of the environment within pixels having a side of 5 or 10 meters, which high environment resolution is more consistent with the dimensions of the town elements and, at the same time, allows computing the local means of the point strength of the radioelectric signal.

A number of different methodologies for computing high resolution environment cell coverage on the basis of the local means of the point strength of the radioelectric signal have been proposed.

For a detailed discussion of these methodologies, the reader is referred to the following publications, which are incorporated herein by reference, in their entirety:

1) EP-A-1 292 163, "*Method for determining the values of the electromagnetic field generated by a radio base station in an urban environment*";
2) M. Perucca, M. Signetti "*Small cells planning analysis of electromagnetic models from measurements at 1800 MHz*", ICAP 1997;
3) COST Action 231 "*Digital mobile radio towards future generation systems*", Chap 4, Final Report EUR 18957, 1999,
4) ITU-R Rec. 1411 "*Propagation data and prediction methods for the planning of short range outdoor radio communication systems and radio local area networks in a frequency range 300 MHz to 100 GHz*";
5) US-A-2001/0041565 "*Method and apparatus for network planning*".

All of these methodologies, however, have been designed and developed for short distances from the radio base station, in particular distances shorter than 1 or 2 kilometers, and consequently they involve a territorial analysis which is entirely carried out using a high environment resolution, i.e., considering pixels having a side of 5 or 10 meters.

Therefore, a paramount problem generally experienced in extending these approaches to large distances (10-20 km) is represented by the computation time and, above all, by the result reliability. In particular, once the refinement level of the computation model has been fixed, the result reliability depends mainly on the number of interactions with the surrounding environment along the scanning line which occur during computation of the local mean of the point strength of the radioelectric signal for the pixel considered. Inevitably, each interaction with the surrounding environment involves a given computation approximation and consequently a computation error which accrues during the computation.

OBJECT AND SUMMARY OF THE INVENTION

The aim of the present invention is to provide a method, a system and a computer program module for planning a radiocommunications network which enable exploiting, on the one hand, the entire low environment resolution cell coverage computation heritage available to the mobile radiocommunications network providers, and, on the other hand, the extensively tested and fully reliable computation algorithms proposed for high resolution cell coverage computation.

This aim is achieved by the present invention in that it relates to a method, a system and a computer program module for planning a radiocommunications network.

In particular, radiocommunications network planning according to the present invention envisages computing cell coverage, wherein computing cell coverage includes dividing the region around the radio base station into a number of large environment pixels; computing, for each large environment pixel, a first quantity indicative of the coverage within the large environment pixel as a function of data describing the environment within large environment pixels along a propagation path of a radioelectric signal radiating out from the radio base station and passing through the large environment pixel; dividing each large environment pixel into a number of small environment pixels; and then computing, for each small environment pixel, a second quantity indicative of the coverage within the small environment pixel, the second quantity being computed as a function of the first quantity computed for the large environment pixel containing the small environment pixel and of data describing the environment within the small environment pixel and within some further small environment pixels within the large environment pixel and arranged upstream, and close to the small environment pixel along a radioelectric signal propagation path passing through the small environment pixel.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein and defined in the attached claims.

Figure 1:
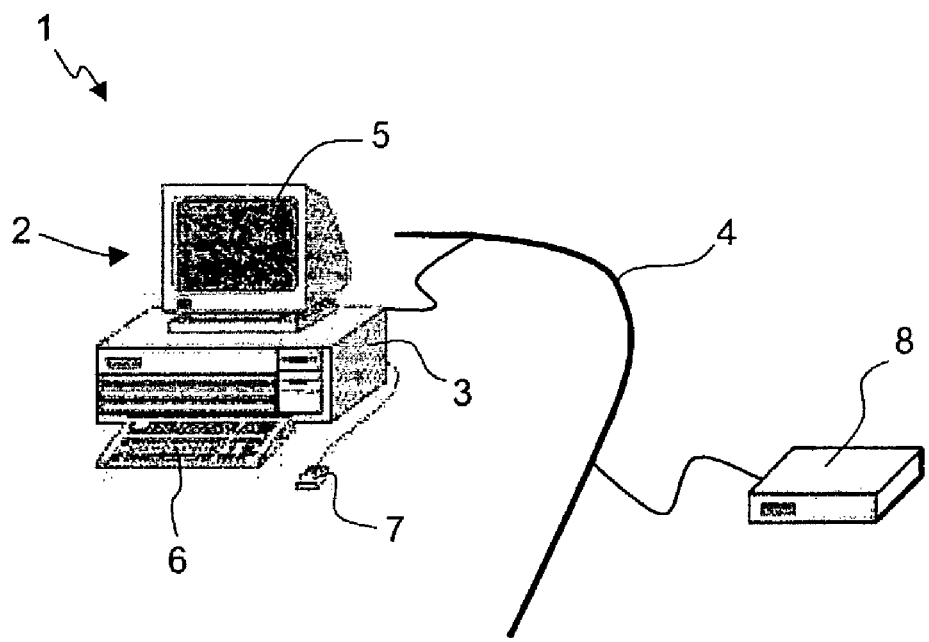
FIG. 1 shows a work station programmed to allow radiocommunications network planning according to the present invention.

FIG. 1 shows a processing system for planning a radiocommunications network for mobile terminals. The processing system, designated as a whole by 1, essentially comprises a work station 2, for example a Hewlett Packard J5000 with a 450 MHz CPU, 1 Gbyte RAM, 18 Gbyte hard disk and UNIX operating system, having a central processing unit 3 connected to a local area network 4, an internal hard disk (not shown) storing reference databases, a display 5, a keyboard 6 and a mouse 7. Should the databases exceed the hard disk storage capacity, the work station 2 may also be provided with an external hard disk 8 connected to central processing unit 3 directly or through the local area network 4.

The work station 2 is configured to allow radiocommunications network planning on the basis of computer program modules which run on the central processing unit 3 and implementing the planning method in accordance with the present invention, with the aid of the reference databases stored in the internal hard disk or in the external hard disk 8.

Broadly speaking, the brainwave at the basis of the present invention is to compute cell coverage by using a double environment resolution, i.e., first of all to compute cell coverage by using a traditional low environment resolution, i.e. by considering large environment pixels, for example having a side of 50-100 meters, e.g. 50 by 50 meters, thus exploiting the known techniques for large scale cell coverage computation, and then to compute cell coverage by using a high environment resolution, i.e. by considering small environment pixels, for example having a side of 5-10 meters, e.g. 5 by 5 meters.

In particular, low environment resolution coverage is computed by dividing the region around the radio base station into a number of large environment pixels, and then computing, for each large environment pixel for which low environment resolution coverage computation is needed, a first quantity (median value of the local means of the point strength of a radioelectric signal) indicative of the coverage within the large environment pixel, whereas high environment resolution coverage is computed by dividing each large environment pixel into a number of small environment pixels, and then computing, for each small environment pixel for which high environment resolution coverage computation is needed, a second quantity (local mean of the point strength of a radioelectric signal) indicative of the coverage within the small environment pixel, the second quantity being computed as a function of the first quantity computed for the large environment pixel containing the small environment pixel and of data describing the environment within the small environment pixel and within some further small environment pixels within the large environment pixel and arranged upstream, and close to the small environment pixel along a radioelectric signal propagation path passing through the small environment pixels.

In a preferred embodiment, the second quantity for a small environment pixel is computed also as a function of data describing the environment within some further small environment pixels arranged just outside the large environment pixel containing the small environment pixel and upstream the small environment pixel along a radioelectric signal propagation path passing through the small environment pixels.

In a further preferred embodiment, the second quantity for a small environment pixel is computed also as a function of the first quantities computed for the large environment pixels which surround the large environment pixel containing the small environment pixel.

In a further preferred embodiment, the second quantity for a small environment pixel is computed by arranging a number of virtual radioelectric signal sources outside the large environment pixel containing the small environment pixel, and then computing the second quantity as a function of the point strength of a radioelectric signal radiating out from at least one of the virtual radioelectric signal sources and having a propagation path passing through the small environment pixel.

In this preferred embodiment, thanks to the fact that the first quantity for the large environment pixel has already been computed during the low environment resolution cell coverage computation, the virtual radioelectric signal sources may be configured to radiate any reference power. In fact, the second quantities computed for the small environment pixels within a large environment pixel as a function of the reference power radiated by the virtual radioelectric signal source may be simply scaled (up or down) so that their average value within the large environment pixel be equal to the first quantity computed for the large environment pixel.

Figure 2:
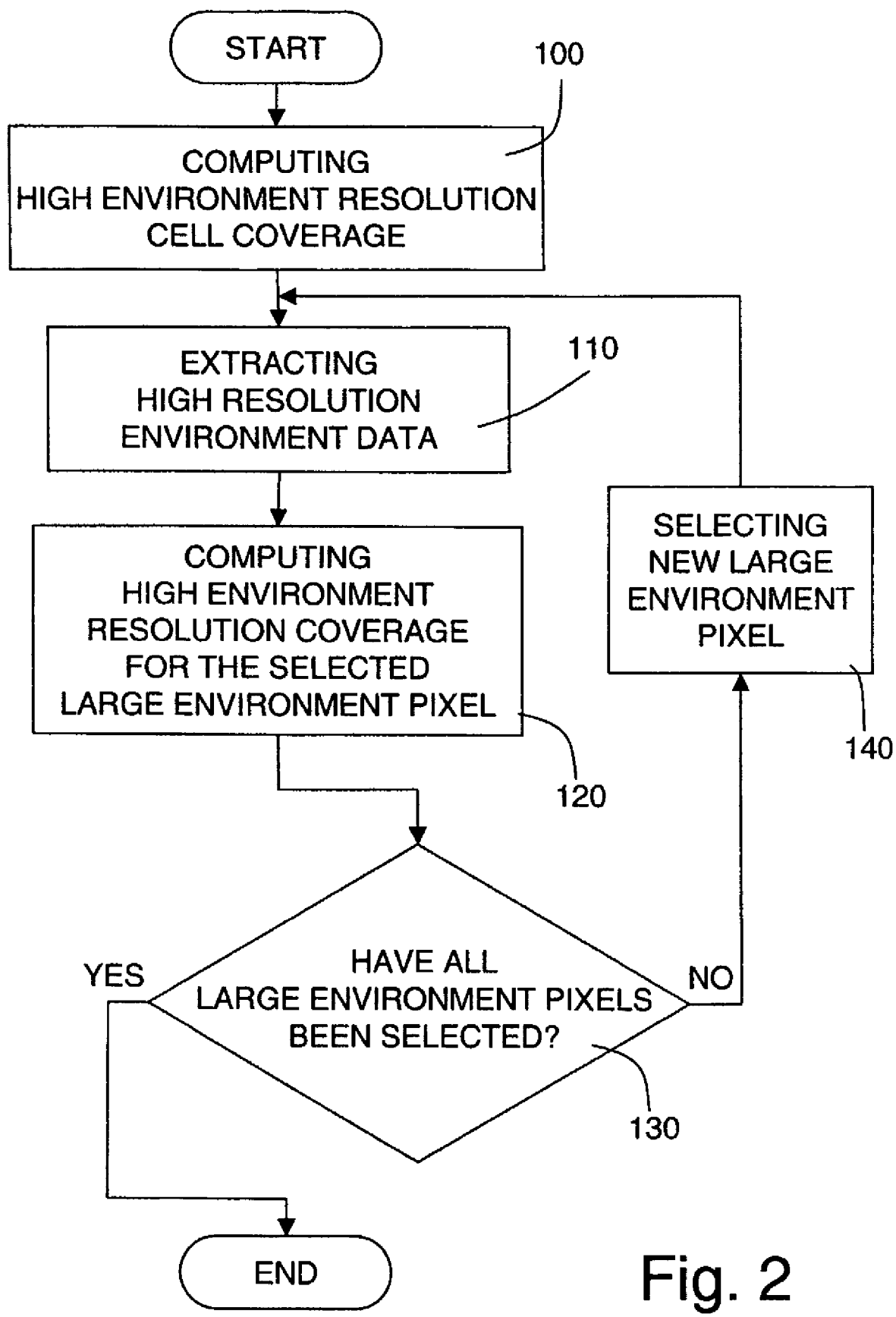
FIG. 2 shows a flow chart of the radiocommunications network planning method of the present invention.

A preferred embodiment of the present invention will now be described with reference to FIGS. 2 and 3, considering a large environment pixel of 50 by 50 meters, and preferably made up of 100 small environment pixels of 5 by 5 meters. These values have been considered appropriate in view of the 2 GHz frequency band which will be used in the future third generation mobile radio communication networks.

The radiocommunications network planning method according to the present invention involves executing the following steps which will be described with reference to the flow chart of FIG. 2.

The first step is computing cell coverage by using a traditional low environment resolution (block 100). In particular, such a traditional low environment resolution cell coverage computation may be carried out either by accessing an electronic data bank containing data relating to a traditional low environment resolution cell coverage already computed for the mobile radiocommunications network or portion thereof where high environment resolution cell coverage is to be computed, or, where such an electronic data bank is not available or not satisfactory, by carrying out a traditional low environment resolution cell coverage computation, i.e. by dividing the region around the radio base station into a number of large environment pixels, and then computing, for each large environment pixel, a first quantity indicative of the coverage within the large environment pixel.

Conveniently, such a traditional low environment resolution cell coverage computation may be based on the methodology disclosed in the above-mentioned publication "*Radiopropagazione*", which is the most suitable for urban areas because it is capable of taking into account the effects due to the territory features (orographical, urbanization and morphological factors).

In particular, to implement such a methodology, the following environment data are to be provided to the model for each large environment pixel: ground altitude with respect to the sea level, average building height, area of the large environment pixel occupied by buildings (in percentage), and appropriately coded vegetation typology.

The second step is computing high environment resolution coverage, which computation involves executing a number of steps which have to be repeated for each large environment pixel where such a high environment resolution coverage computation is desired.

Broadly speaking, high environment resolution coverage computation involves dividing a large environment pixel into a number of small environment pixels, and computing, for each small environment pixel within the same large environment pixel and for which such a high environment resolution coverage computation is desired, a second quantity indicative of the coverage within the small environment pixel.

In particular, the first step of the high environment resolution coverage computation is preparing high resolution environment data necessary to coverage computation by using high environment resolution (block 110). In particular, preparing high resolution environment data includes extracting, from a digital cartography database, high resolution environment data relative to the small environment pixels within the selected large environment pixel for which high environment resolution coverage computation is needed.

To improve high environment resolution coverage computation within a large environment pixel, preparing high resolution environment data may also include extracting, from the digital cartography database, high resolution environment data relative to an external area surrounding the large environment pixel.

In more detail, high resolution environment data include ground altitude with respect to the sea level and building height (if any) with respect to the ground level. In a preferred embodiment, from the digital cartographic database there are extracted 200 values (100 for altitudes and 100 for building heights) relative to the selected large environment pixel, and 312 values (156 for altitudes and 156 for building heights) relative to an external annular area around the large environment pixel and having a width of three small environment pixels.

When the high resolution environment data have been extracted, high environment resolution coverage is computed for this large environment pixel (block 120).

In particular, high environment resolution coverage computation envisage replacing the radio base station with some sort of wave front of a radioelectric signal radiating therefrom as it is in a given location outside the large environment pixel. In more detail, such a sort of wave front of the radioelectric signal radiating from the radio base station is simulated by arranging a number of virtual radioelectric signal sources (array of electromagnetic feeds) having a particular pattern in said given location outside the large environment pixel.

Figure 3:
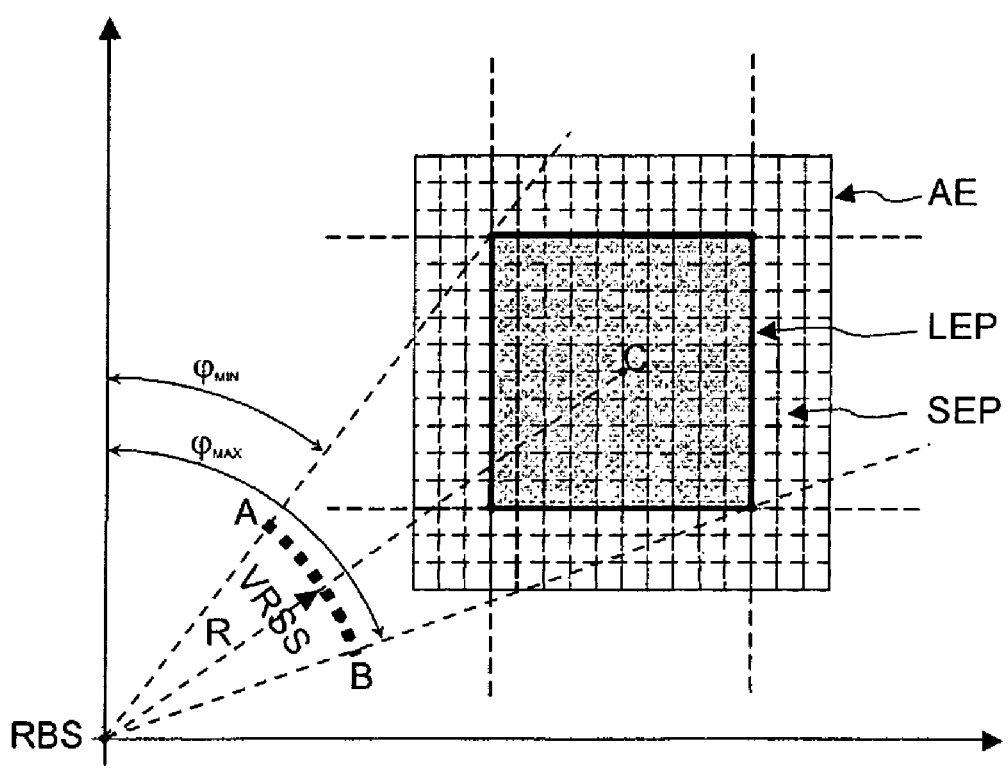
FIG. 3 shows, not in scale, a radio base station, virtual radioelectric signal sources, a large environment pixel and small environment pixels within the large environment pixel which are taken into account during coverage computation carried out during the radiocommunications network planning according to the present invention.

FIG. 3 shows, not in scale, the virtual radioelectric signal sources VRSS, the radio base station RBS, a large environment pixel LEP, depicted in grey and bordered by a bold line, the small environment pixels SEP within the large environment pixel LEP, the annular area AE surrounding the large environment pixel LEP, and the small environment pixels SEP within the annular area AE.

As is shown in FIG. 3, the virtual radioelectric signal sources VRSS are equispatially arranged along a circumference arc having:

- center in the radio base station RBS,
- radius R equal to the difference between the distance between the radio base station RBS and the center C of the large environment pixel LEP and the distance between the center C of the large environment pixel and the circumference arc, and
- ends A e B which lie respectively on the lines linking the radio base station RBS and the corners of the large environment pixel LEP corresponding to the minimum and maximum azimuth angles $\phi_{min}$, $\phi_{max}$ thereof with respect to the radio base station RBS.

Furthermore, the distance between two adjacent virtual radioelectric signal sources VRSS along the arc is substantially equal to the side of a small environment pixel SEP, i.e., about 5 meters in the preferred embodiment considered, and the height of the virtual radioelectric signal sources VRSS is equal to the sum of the ground altitude with respect to the sea level and the average building height within the large environment pixel LEP.

Furthermore, in a preferred embodiment the distance between the center C of the large environment pixel LEP and the circumference arc along which the virtual radioelectric signal sources VRSS are arranged is equal to the diagonal of the large environment pixel LEP, i.e., about 70 meters in the preferred embodiment considered.

Lastly, consistently with the aforementioned criteria, in the preferred embodiment considered, the number of the virtual radioelectric signal sources VRSS is equal to 15.

The aforementioned values are then used to compute high environment resolution coverage for the selected large environment pixel, which computation is essentially carried out by resorting to a solution based on diffraction elements of the type disclosed in the aforementioned "*Small cells planning analysis of electromagnetic models from measurements at 1800 MHz*".

In particular, a fundamental difference with respect to what is disclosed in the aforementioned publication lies in the pixel scanning methodology. In fact, having regard to fact that the radio base station has been replaced with a number of virtual radioelectric signal sources, the scanning methodology is not based anymore on radial scanning lines originating from the radio base station, but instead on scanning lines originating from the virtual radioelectric signal sources and being the prolongation of theoretical lines linking the radio base station and the virtual radioelectric signal sources.

Figure 5:
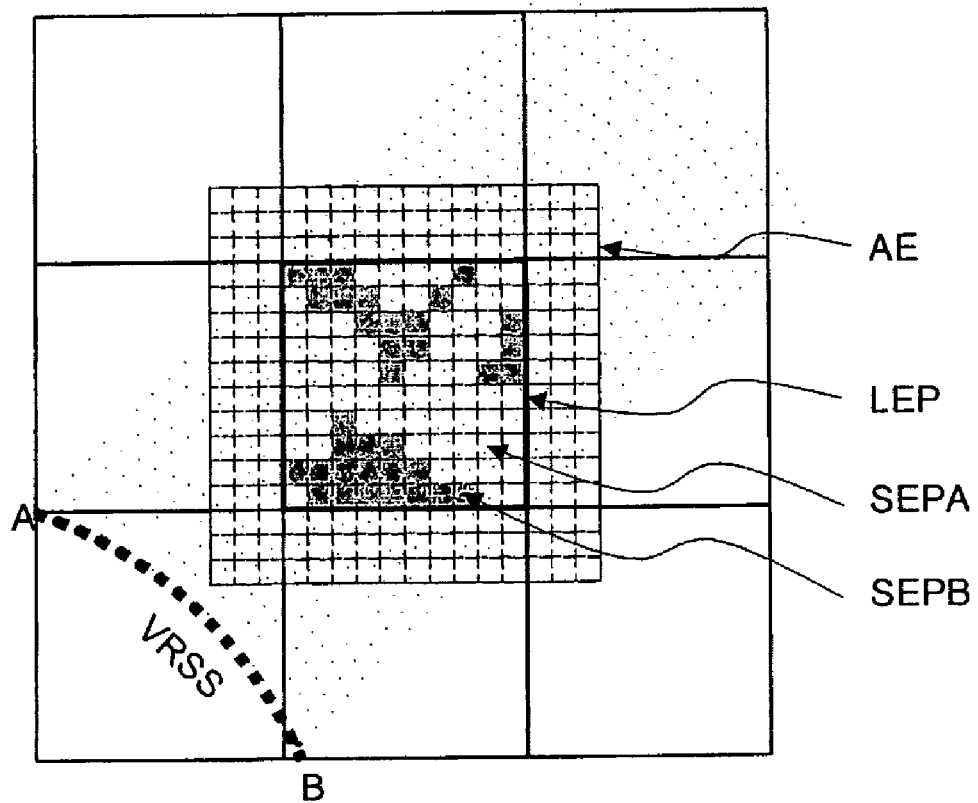
FIG. 5 shows a small environment pixel including a road junction.

According to an aspect of the present invention, high environment resolution coverage is computed only for those small environment pixels which do not contain buildings. FIG. 5 shows a large environment pixel LEP containing a road junction, wherein the small environment pixels SEPB depicted in grey represent presence of buildings, whereas the other small environment pixels SEPA represent absence of buildings. Consistently with the aforementioned criteria, high environment resolution coverage is computed only for the small environment pixels SEPA.

In detail, high environment resolution coverage computation envisages computing, for each of said small environment pixels, the local mean of the point strength, within the small environment pixel, of a radioelectric signal radiating out from a virtual radioelectric signal source and having a propagation path (scanning line) passing through the small environment pixel.

Figure 4:
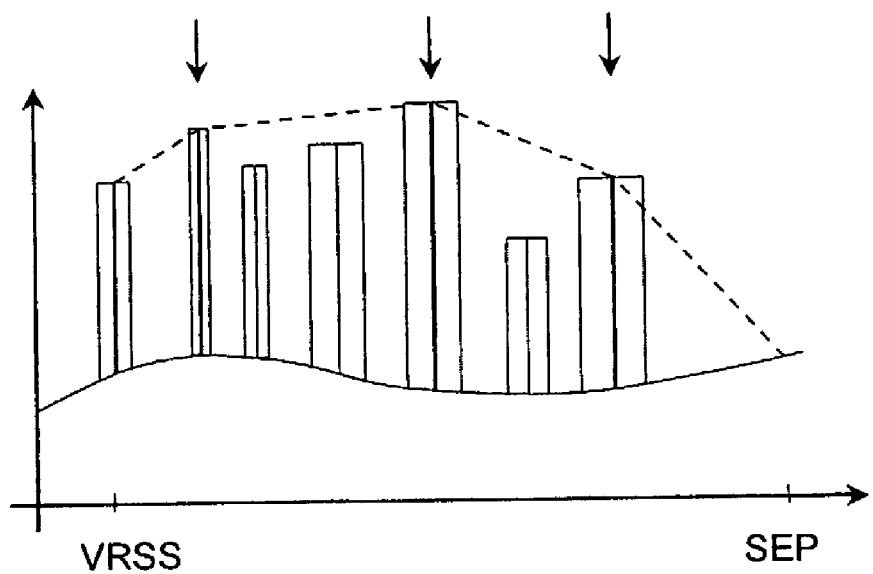
FIG. 4 shows a composite altimetric profile computed during radiocommunications network planning.

To do so, starting from the external area surrounding the large environment pixel and moving along the scanning line with a step equal to half of the side of the small environment pixel, i.e., 2.5 meters in the embodiment considered, a composite high environment resolution altimetric profile of the type shown in FIG. 4 is computed as a function of the ground altitude with respect to the sea level and of the building height with respect to the ground altitude.

To determine attenuation by diffraction due to the buildings arranged along the scanning line, a propagation model based on the above-described Huygens-Fresnel theory is used, which theory, as initially said, envisages replacing each obstacle (in the present case predominantly represented by buildings) with an ideal screen, i.e. by a half-plane made of perfectly absorbent material and having an infinitesimal thickness in the propagation direction and an infinite length in a perpendicular direction. This approximation of the original obstacle is commonly known as "knife edge obstacle", which has an height equal to the original object (building or orographic maximum) and is arranged exactly in the center of the original obstacle.

To predict the diffraction effects the method disclosed in the aforementioned "*Propagation by diffraction*" (ITU-Reccommendations Rec. P. 526-3) may conveniently be used, together with the so-called stretched string technique for identifying obstacles, defined in the aforementioned ITU-Recommendations, according to which only obstacles, denoted by rows in FIG. 4, which "touch" an ideal stretched string extending between the virtual electromagnetic source VRSS and the small environment pixel SEP for which computation is being carried out are taken into consideration.

According to another aspect of the present invention, the virtual radioelectric signal sources may radiate any generic reference power (e.g. 1 dBm) since the average strength (median value) of the radioelectric signal within the selected large environment pixel has already been computed during the previous low environment resolution cell coverage computation. In fact, the local means of the point strength of the radioelectric signals radiating out from the virtual radioelectric signal sources may be simply scaled (up or down, depending on the relationship between the power radiated by the radio base station and the power radiated by the virtual radioelectric signal sources) in such a manner that their average value within the large environment pixel be equal to the median value computed during the previous low environment resolution coverage computation carried out for the large environment pixel.

In a preferred embodiment, the coverage (local means) computed within the small environment pixels within the same large environment pixel have to be scaled by using a scaling factor K which is computed as a function of the coverage (median value) within the selected large environment pixel and the coverage (local means) within the small environment pixels computed by configuring the virtual radioelectric signal sources to radiate a generic reference power, according to the following formula:

$$K = \frac{E^{LR}}{\frac{1}{N_{max}} \cdot \sum_{i=1}^{N_{max}} E_i^{HR}}$$

wherein:
$E^{LR}$ is the coverage (median value) within the large environment pixel (the median value being approximately comparable to the average value of the local means);
$E_i^{HR}$ is the coverage (local mean) within the i-th small environment pixel computed by assigning a generic reference power to the virtual radioelectric signal sources (e.g. 1 dBm); and
$N_{max}$ is the total number of small environment pixels within the large environment pixel (100 in the preferred embodiment described).

In another preferred embodiment, in order to smoothen the passage from a large environment pixel to an adjacent one in terms of coverage, i.e., to prevent two adjacent small environment pixels arranged across the border line between two adjacent large environment pixels from having a big difference in coverage due to the possible big difference in coverage between the two adjacent large environment pixels, the scaling factor K may be computed not only as a function of the coverage (median value) within the selected large environment pixel and the coverage (local means) within the small environment pixels computed by configuring the virtual radioelectric signal sources to radiate a generic reference power, but also as a function of the coverage (median value), appropriately weighted, within the eight large environment pixels surrounding the selected large environment pixel, according to the following formula:

$$K_i = \frac{E_i^{LR}}{\frac{1}{N_{max}} \cdot \sum_{i=1}^{N_{max}} E_i^{HR}}$$

where:

$$E_i^{LR} = \frac{1}{D_i} \cdot \sum_{j=1}^{9}\left(\frac{1}{d_{i,j}} \cdot E_i^{HR}\right)$$

$$D_i = \sum_{j=1}^{9} \frac{1}{d_{i,j}}$$

and wherein:

$E_i^{LR}$ is the coverage (median value) computed for the selected large environment pixel also as a function of the eight large environment pixels surrounding the large environment pixel;

$D_1$ is a normalization factor relative to the small environment pixel;

$d_{i,j}$ is the distance between the i-th small environment pixel (left bottom corner of the pixel) and the center of the j-th large environment pixel;

$E_1^{HR}$ is the coverage (local mean) within the i-th small environment pixel;

$E_j^{LR}$ is the coverage (median value) within the j-th large environment pixel; and $N_{max}$ is the total number of small environment pixels within the large environment pixel (100 in the preferred embodiment described).

Figure 6:
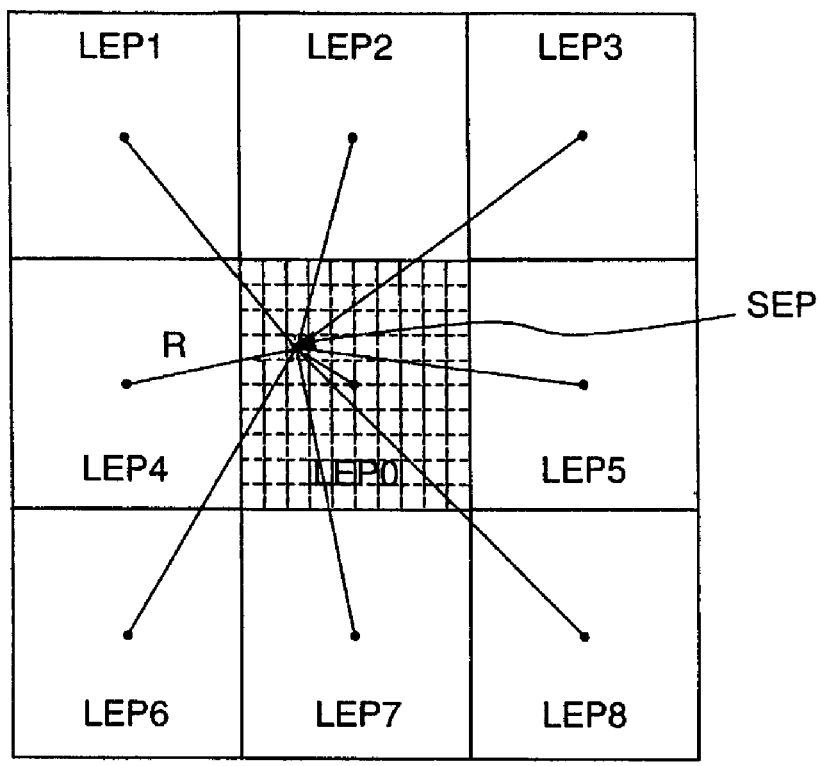
FIG. 6 shows large environment pixels surrounding a large environment pixel for which high environment resolution coverage is computed.

In other words, as shown in FIG. 6, the coverage (local mean) computed for a small environment pixel SEP, depicted in grey, within a large environment pixel LEP0 by assigning a generic reference power to the virtual radioelectric signal sources VRSS is multiplied by a scaling factor K which depends on the coverage (median value) computed for the large environment pixel LEP0, on the coverages (median values) computed for the eight large environment pixels LEP1-LEP8 surrounding the large environment pixel LEP0, and on the distance R between the small environment pixel SEP and the large environment pixels LEP0-LEP8. In particular, the coverages computed for the large environment pixel LEP0-LEP8 are weighted by using respective weights which are inversely proportional to the distances between the small environment pixel SEP and the centers of the large environment pixels LEP0-LEP8. In this way, it is evident that the bigger is distance between a large environment pixel LEP and the small environment pixel SEP, the smaller is the influence that this large environment pixel LEP exerts on the small environment pixel SEP. It is therefore evident that the coverage computed for a small environment pixel SEP is more influenced by the coverage computed for the large environment pixel LEP containing the small environment pixel SEP and by the coverages computed for the large environment pixels LEP which are closer to the small environment pixel SEP.

Once the high environment resolution coverage for the selected large environment pixel is computed, another large environment pixel is selected, if any (blocks 130 and 140), and the high environment resolution coverage computation previously described with reference to blocks 110 and 120 is repeated for the large environment pixel newly selected. When high environment resolution coverage has been computed for all large environment pixels for which high environment resolution coverage computation is needed, the latter ends.

To roughly predict the computational load, let's consider a situation in which a number of virtual radioelectric signal sources are arranged along a circumference arc 70 meters long and are 5 meters spaced apart (equal to the side of the small environment pixel). In this situation, 15 virtual radioelectric signal sources are provided, from each of which a scanning line 50 meters long originates (medium thickness of a large environment pixel with a side of 50 meters under a generic illumination angle). This situation involves, for each large environment pixel, a computational load equivalent to a high environment resolution computation of a scanning line 750 meters long.

A traditional approach, on the contrary, involves a computation entirely carried out at a high environment resolution along the scanning lines between the radio base station and the small environment pixels (with angular and radial steps suitable for computing representatively the whole area). It is therefore evident that the double environment resolution computation is far more efficient than a single environment resolution computation, at least starting from distances greater than 750 meters from the radio base station.

It is useful to point out that, for typical coverage areas with a radius of 30 km, the area within which such benefits in terms of efficiency with respect to a traditional approach may be obtained, is more than 99.9% of the whole coverage area.

Another aspect of the present invention is the way of computing coverage within a building which occupies some small environment pixels. In view of the complexity of the propagation phenomena induced by this particular physical conditions, this specific topic is commonly addressed in the prior art by hypothesizing, on a statistical basis, a single additional penetration margin for the entire building, if necessary appropriately differentiated by environment typology and/or building typology, which is added to the coverage (median value of the local means of the point strength of the radioelectric signal) computed for the small environment pixels but considering the environment open, i.e., empty of buildings.

From an experimental point of view, this common approach envisages measuring the average point strength of radioelectric signals outside the building (for example along the perimeter of the building, at ground level) and then adding the hypothesized penetration margin. From a modellistic point of view, instead, this approach implicitly involves a low resolution coverage computation for the large environment pixels occupied by the building, i.e., involves computing the median values of the local means of the point strength of a radioelectric signal within the large environment pixels occupied by the building by using low resolution environment data (percentage of each large environment pixel occupied by the building).

This approach is not compatible with a high environment resolution coverage computation because, in view of the size of the small environment pixels, the percentage of each small environment pixel which is occupied by a building would be 0 or 100% (absence or presence of a building).

Figure 7:
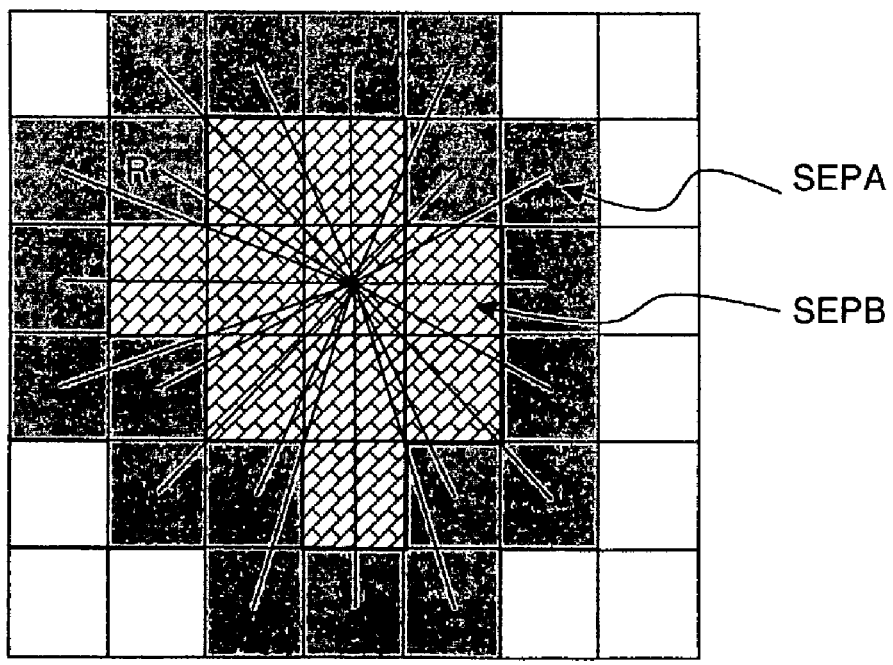
FIG. 7 shows small environment pixels occupied by a building and for which high environment resolution coverage is computed.

Therefore, instead of hypothesizing a single additional penetration margin to be added to the coverage computed for the large environment pixels occupied by the building, as shown in FIG. 7 the coverage (local mean of the point strength of a radioelectric signal) for each small environment pixel SEPB occupied by the building, depicted with a geometrical pattern, is computed as a function of the coverages computed for the small environment pixels SEPAS, depicted in grey, surrounding the small environment pixels SEPB. In particular, as shown in FIG. 7, coverage for a small environment pixel SEPB occupied by a building is computed as a weighted average of the coverages computed for the small environment pixels SEPA surrounding the small environment pixel SEPB, and such coverages are weighted by using respective weights which may for example be inversely proportional to the squared distances ($1/r^2$) between the centers of the small environment pixel SEPB and the small environment pixels SEPA surrounding the small environment pixel SEPB. Obviously, other weights may be used, all however having values which reduce as the distance increases.

Finally, it is clear that numerous modifications and variants can be made to the present invention, all falling within the scope of the invention, as defined in the appended claims.

For example, high environment resolution coverage computation may be carried out either for all large environment pixels around the radio base station or for only some of them, and, within a large environment pixel, for all small environment pixels or for only some of them, depending on the needs of the mobile radiocommunications network provider.

Furthermore, high environment resolution coverage computation for a given small environment pixel within a selected large environment pixel may be carried out as a function of data describing the environment within either all small environment pixels located upstream said given small environment pixel along the radioelectric signal propagation path passing through the given small environment pixel and within the selected large environment pixel, or only some of them, depending on the reliability which is needed for the high environment resolution coverage computation. In the latter case, it may be convenient to take account of data describing the environment within the small environment pixels closer to the given small environment pixel.

Moreover, the virtual radioelectric signal sources may be arranged side by side not only along a circumference arc, but also along any type of line, for example a generally curved line or a straight line.

Lastly, data describing the environment within large and small environment pixels may be different than the ones described above.

The invention claimed is:

1. A method for planning a radiocommunications network, comprising:
   computing, using a computer, cell coverage, to indicate a region around a radio base station where a radioelectric signal radiating out from the radio base station copes with given requirements;
   wherein computing the cell coverage comprises:
   dividing the region around said radio base station into a number of first areas;
   for each first area, computing a first quantity indicative of the cell coverage within the first area as a function of data describing an environment within the first areas along a propagation path of a radioelectric signal radiating out from said radio base station and passing through said first area;
   dividing at least some of said first areas into a number of second areas; and
   for at least some of said second areas, computing respective second quantities indicative of the cell coverage within said second areas, each second quantity being computed for a respective second area as a function of at least the first quantity computed for the first area containing said respective second area and of data describing the environment within said respective second area and within at least some further second areas within said first area and arranged upstream said respective second area along a radioelectric signal propagation path passing through said respective second area,
   wherein each second quantity is computed for the respective second area also as a function of the first quantities computed for first areas surrounding the first area containing said respective second area, and
   wherein in the computation of each second quantity for the respective second area, the first quantities computed for the first areas surrounding the first area containing said respective second area are each weighted by using a respective weight which is inversely proportional to a distance between said respective second area and the corresponding first area.

2. The method as claimed in claim 1, wherein each second quantity is computed for the respective second area also as a function of data describing the environment within some further second areas arranged just outside the first area containing said respective second area and upstream said respective second area along said radioelectric signal propagation path.

3. The method as claimed in claim 1, wherein said second quantities are computed for second areas empty of buildings.

4. The method as claimed in claim 1, wherein computing a second quantity for a respective second area comprises:
   arranging a number of virtual radioelectric signal sources outside the first area containing said respective second area; and
   computing said second quantity as a function of the point strength of a radioelectric signal radiating out from at least one of said virtual radioelectric signal sources and having a propagation path passing through said respective second area.

5. The method as claimed in claim 4, wherein the propagation path of the radioelectric signal radiating out from said virtual radioelectric signal source is the prolongation of a theoretical line linking said radio base station and said virtual radioelectric signal source.

6. The method as claimed in claim 4, wherein said virtual radioelectric signal sources are arranged side by side along a line.

7. The method as claimed in claim 6, wherein said virtual radioelectric signal sources are equispatially arranged side by side along said line.

8. The method as claimed in claim 6, wherein said second areas have a polygonal shape, and wherein the distance between two adjacent virtual radioelectric signal sources along said line is correlated to a side of said second areas.

9. The method as claimed in claim 6, wherein said line is a curved line.

10. The method as claimed in claim 9, wherein said curved line is a circumference arc having center in said radio base station.

11. The method as claimed in claim 10, wherein said circumference arc has radius equal to the difference between the distance between said radio base station and the center of the first area containing said respective second area and the distance between the center of said first area and said circumference arc.

12. The method as claimed in claim 11, wherein said first areas have a square shape, and wherein the distance between the center of said first area and said circumference arc is correlated to the diagonal of said first area.

13. The method as claimed in claim 10, wherein ends of said circumference arc lie on theoretical lines which link said radio base station and corners of the first area containing said respective second area and which correspond to minimum and maximum azimuth angles of said first area with respect to said radio base station.

14. The method as claimed in claim 4, wherein the height of each virtual radioelectric signal source is substantially equal to the sum of the ground altitude with respect to the sea level and the building height within the first area containing said virtual radioelectric signal source.

15. The method as claimed in claim 4, wherein said virtual radioelectric signal sources radiate a reference power.

16. The method as claimed in claim 4, wherein the power radiated by said virtual radioelectric signal sources is uncorrelated with the power radiated by said radio base station.

17. The method as claimed in claim 1, wherein said data describing the environment within the first area include ground altitude with respect to the sea level, average building height, percentage of the first area occupied by buildings, and vegetation typology.

18. The method as claimed in claim 1, wherein said data describing the environment within said respective second area include ground altitude with respect to the sea level and building height with respect to the ground level.

19. The method as claimed in claim 1, wherein a second quantity for a second area occupied by a building is computed as a function of second quantities computed for second areas surrounding the second area occupied by the building.

20. The method as claimed in claim 19, wherein a second quantity for a second area occupied by a building is computed as a weighted average of second quantities computed for second areas surrounding the second area occupied by the building.

21. The method as claimed in claim 20, wherein said second quantities computed for second areas surrounding the second area occupied by the building are weighted by using respective weights which are inversely proportional to the squared distances between the second area occupied by the building and the second areas surrounding the second area occupied by the building.

22. A processing system capable of being programmed to implement the method according to claim 1.

23. Computer program modules comprising computer program code means, said computer program modules being able, when loaded in a processing system, to implement the method according to claim 1.

* * * * *